United States Patent
Closs et al.

(10) Patent No.: US 11,473,826 B2
(45) Date of Patent: Oct. 18, 2022

(54) CRYOGENIC COOLING APPARATUS, METHODS, AND APPLICATIONS

(71) Applicant: Mitegen, LLC, Ithaca, NY (US)

(72) Inventors: David Closs, Freeville, NY (US);
Stephen Hollabaugh, Ithaca, NY (US);
Robert E. Thorne, Ithaca, NY (US);
Robert Newman, Groton, NY (US);
Benjamin A. Apker, Ithaca, NY (US)

(73) Assignee: MiTeGen, LLC, Ithaca, NY (US)

( * ) Notice: Subject to any disclaimer, the term of this patent is extended or adjusted under 35 U.S.C. 154(b) by 937 days.

(21) Appl. No.: 15/220,868

(22) Filed: Jul. 27, 2016

(65) Prior Publication Data

US 2017/0030626 A1    Feb. 2, 2017

Related U.S. Application Data

(60) Provisional application No. 62/197,205, filed on Jul. 27, 2015.

(51) Int. Cl.
*A01N 1/02* (2006.01)
*F25D 3/10* (2006.01)

(52) U.S. Cl.
CPC ............. *F25D 3/10* (2013.01); *A01N 1/0252* (2013.01); *F25D 2400/02* (2013.01)

(58) Field of Classification Search
CPC ..... F25D 3/10; F25D 2400/02; A01N 1/0252; A01N 1/0257; A01N 1/0242; A01N 1/02; A01N 1/0268; A47J 41/00; A47F 3/04; G01N 1/42; H01L 23/445
See application file for complete search history.

(56) References Cited

U.S. PATENT DOCUMENTS

| | | | | |
|---|---|---|---|---|
| 3,778,975 A | * | 12/1973 | Deans | G01N 30/18 96/105 |
| 4,149,388 A | * | 4/1979 | Schneider | F17C 7/04 62/50.3 |
| 2011/0098841 A1 | * | 4/2011 | Tsuda | C23C 16/409 700/117 |

* cited by examiner

*Primary Examiner* — Frantz F Jules
*Assistant Examiner* — Webeshet Mengesha
(74) *Attorney, Agent, or Firm* — Quinn IP Law

(57) ABSTRACT

A cryogenic cooling manifold and methods incorporating a cryogenic cooling manifold for managing the gas layer(s) above a liquid cryogen to control cooling temperature-time profiles and ice formation for microliter and smaller samples that are plunged through the gas and into the liquid cryogen.

30 Claims, 11 Drawing Sheets

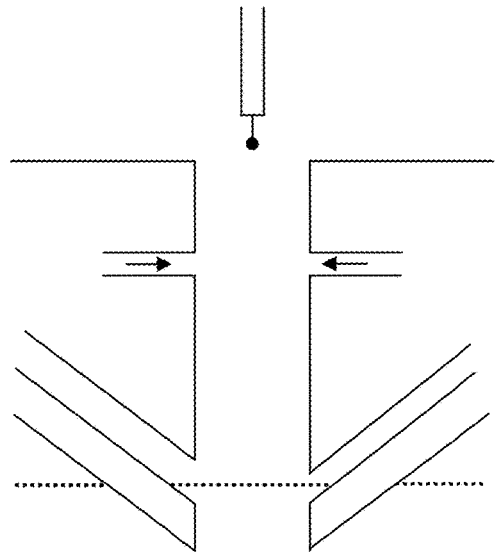
Fig. 10(A)
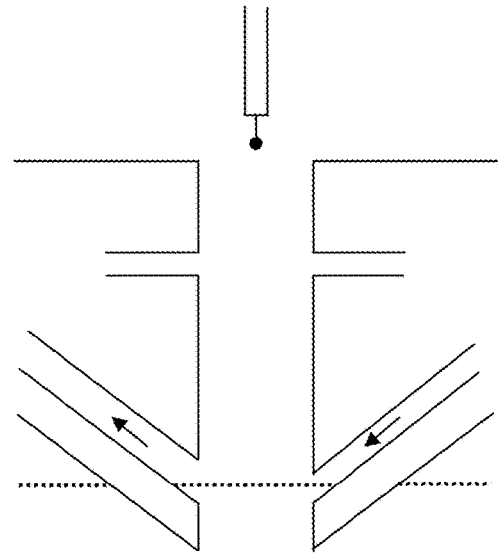
Fig. 10(B)
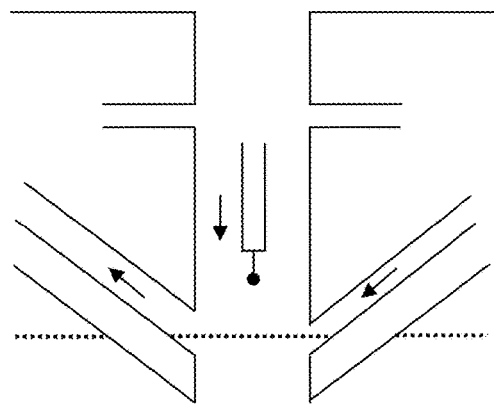
Fig. 10(C)
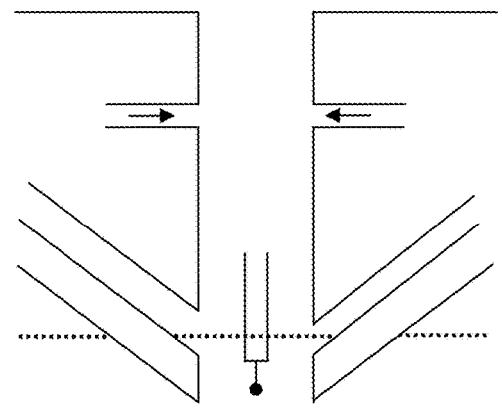
Fig. 10(D)
Figure 10

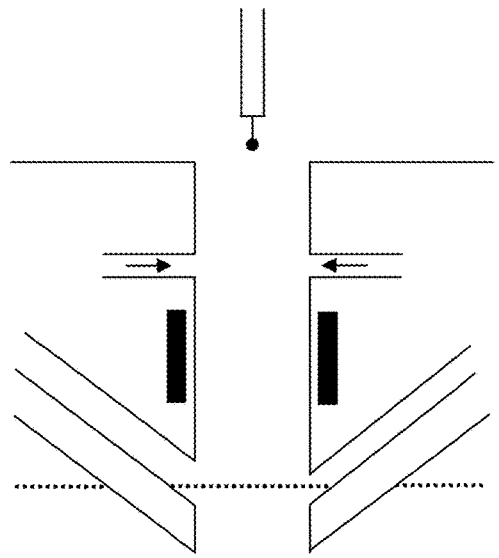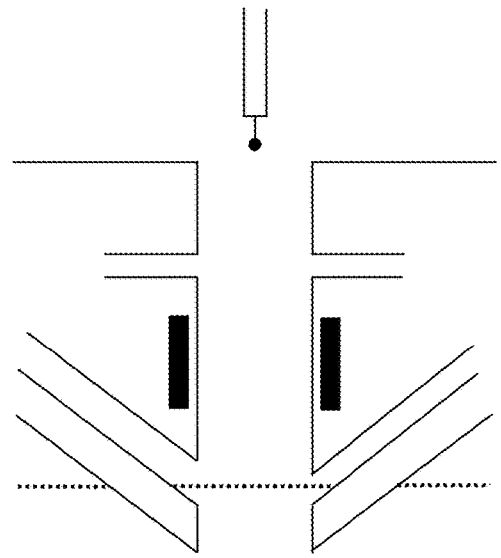
Fig. 11(A)  Fig. 11(B)
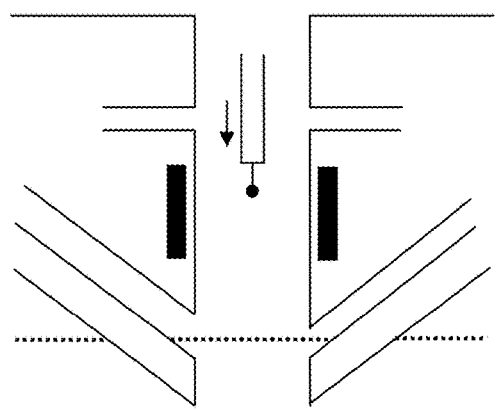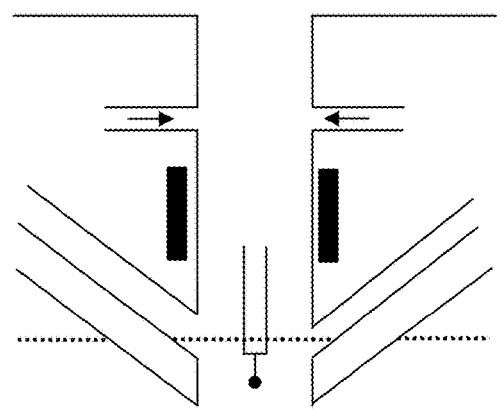
Fig. 11(C)  Fig. 11(D)
Figure 11

CRYOGENIC COOLING APPARATUS, METHODS, AND APPLICATIONS

RELATED APPLICATION DATA

The instant application claims priority to U.S. provisional application 62/197,205 filed Jul. 27, 2015, the subject matter of which is incorporated by reference in its entirety.

ACKNOWLEDGEMENT OF GOVERNMENT SUPPORT

This invention was made with support under Phase I (1R43GM101817-1) and Phase II (2R44GM101817-02) SBIR Grants to Mitegen, LLC awarded by the NIH. The U.S. government has certain rights in the invention.

BACKGROUND

Field of the Invention

The invention pertains to the field of biotechnology. More particularly, the invention pertains to the design of systems for rapid and variable-rate cooling of small biological samples.

Description of Related Art
Cryogenic Sample Cooling in X-ray Crystallography

X-ray crystallography is the most powerful and widely used tool for determining the molecular structures of proteins, viruses, nucleic acids and biomolecular complexes. These structures are critical to modern molecular biology and to the development of pharmaceutical treatments for conditions and diseases.

X-ray data collection is typically performed on crystals cooled to T=100 K or below. At room temperature, crystals of proteins, viruses and other biomolecules are rapidly damaged by X-rays. In most cases, only a fraction of the data required to determine the molecular structure can be obtained from each crystal, especially when small (10-50 μm) crystals produced in early crystallization trials are used. Growing large crystals requires careful, expensive, and time-consuming optimization. At room temperature, crystals must be handled carefully: they can easily be damaged by mechanical contact; they can dry out, causing loss of diffraction; and significant temperature changes can cause changes in protein structure. Thus, more than 98% of X-ray data is collected from crystals cooled to T~100 K. At cryogenic temperatures, crystals can typically withstand X-ray doses 30 times larger than at 300 K, sometimes allowing structure determination using a single crystal. Crystals are cooled by plunging them from air into liquid nitrogen or liquid propane. Cryo-cooled crystals are as hard as ice and insensitive to large temperature changes below ~150 K, so that they can be easily stored, shipped, and manipulated at the synchrotron. Consequently, the introduction of cryocrystallographic methods for biomolecular crystallography in the 1990s was transformative.

Unfortunately, cooling crystals damages them and degrades their X-ray diffraction properties. Ice can nucleate and grow inside them, disrupting the lattice and producing strong X-ray diffraction "rings" that obscure diffraction from the protein. Stresses induced by cooling break crystals into small mosaic domains with different orientations. Mosaicities increase from perhaps 0.01° at room temperature to 0.3°-2° at 100 K. For viruses and other large biomolecular structures, increased mosaicity can cause diffraction peaks to overlap and prevent structure solution, so data must often be collected on unfrozen crystals. Cooling-induced damage can also decrease diffraction peak intensities, decreasing the resolution and accuracy of the resulting electron density maps and molecular models.

In typical cryocrystallographic practice, a crystal is either grown in or soaked in a drop containing cryoprotectants (glycerol, ethylene glycol, MPD, PEG), and harvested from the drop using a nylon or microfabricated loop attached to a metal goniometer base. It is then directly plunged by hand into an open-mouth Dewar or an open foam box filled with liquid nitrogen (in the process bringing typically ungloved fingers within centimeters of the liquid cryogen), and finally inserted into a cryovial or a multiple-sample puck or cassette for storage and transport. Multiple crystals may be soaked in solutions with different cryoprotectant types and concentrations in an effort to optimize diffraction quality.

These manual methods exacerbate damage during cooling and may not accurately capture the biologically relevant molecular structure. Depending on the liquid nitrogen/cryogen fill level, the ambient air conditions, and the plunge speed and direction, cooling rates range from less than 100 K/s to perhaps 1000 K/s. Cooling to 100 K takes ~0.2-2 seconds, providing substantial time for ice crystals to nucleate and grow, and necessitating the use of large cryoprotectant concentrations—typically 30% w/v—to inhibit ice formation. Protein structure and stability evolve as temperature decreases below 300 K; the hydrophobic interaction weakens and the pKa's of most side chains vary strongly. Cooling times of ~1 s are sufficient to allow large conformational motions of e.g., of mobile loops, flaps and flexible stretches of polypeptide near the active site, and may be too long to capture critical information about protein conformational dynamics, including the population of minor conformers important in binding the catalytic transition state.

Moreover, these manual methods are experimenter-dependent and yield irreproducible results. Crystal cooling is most often done by graduate students and others with little formal training, especially those from the increasing number of laboratories for which cryocrystallography is a tool rather than a focus. Even crystals of simple, robust and easily-grown proteins like lysozyme can show large variations in post-cool diffraction resolution and especially in mosaicity. Variability in cooling confounds attempts to identify and address other causes of poor diffraction. Consequently, to get one crystal that diffracts well, crystallographers typically mount, cool, ship to the synchrotron, and collect data from many nominally similar crystals. 98% of X-ray data sets collected on biomolecular crystallography beam lines do not yield structures.

Cryogenic Plunge Cooler Designs

Automated instruments to make cooling more reproducible and increase cooling rates have long been used in cryoelectron microscopy. At least four commercial plunge cooling instruments are available (from Electron Microscopy Sciences, Gatan, Leica and FEI), ranging from a crude gravity-drop plunger to systems with pneumatic drives that blot excess sample liquid within a humidified environment prior to plunging. All plunge the sample at speeds of ~1.5 m/s into a temperature-controlled container of liquid propane or ethane that is surrounded by a liquid nitrogen bath.

To achieve the fastest cooling rates in cryopreservation, the long-standard approach has been to plunge samples at high speed into liquid cryogens like propane or ethane. Large plunge speeds minimize the time interval between first sample contact with the cryogen and full immersion, and maximize the convective velocity of the fluid relative to the sample. Propane and ethane have a large separation between their melting and boiling temperatures, large specific heats, and relatively high thermal conductivity, and thus can absorb substantial heat from the sample without generating insulating vapor that, in liquid nitrogen, reduces cooling rates. Propane cooling has sometimes yielded X-ray structures when nitrogen cooling failed. But both propane and ethane are highly flammable, and splashing when the loop-holding goniometer base impacts their surface during a plunge presents substantial hazards.

Cooling in Cold Gas Layers

Aside from cryogen choice and plunge speed, control of cold gas layers above the cryogenic surface is also important in maximizing cooling rates when cooling small samples. A layer of cold gas of 1 cm thickness or more exists above any cryogenic surface, formed by conduction, convection and (in the case of liquid cryogens near their boiling point) by evaporation. This cold gas layer must cool the sample as it passes through it toward the liquid cryogen. Large samples undergo little cooling as they pass through this layer at typical plunge speeds of ~0.5 m/s, so that most cooling occurs in the liquid cryogen. However, at modest plunge speeds of ~0.5 m/s, for samples with volumes smaller than ~0.1 μl (diameters smaller than ~600 μm) most cooling occurs not in the liquid cryogen but in the thin cold gas layer above.

The solution to the cold gas layer problem is simply to remove the cold gas layer, creating as abrupt a transition as possible along the sample's plunge path between gas at room temperature or some desired intermediate temperature (e.g., 273 K, or the melting temperature of the aqueous solvent present in and around the sample) and the liquid cryogen. In practice, the gas layer thickness should be reduced to a thickness comparable to the sample size, or less than 100 μm. By doing so, cooling rates for 80 μm samples plunged in liquid nitrogen can be increased from a ~300 K/s to ~45,000 K/s, so that cooling from room temperature to 150 K occurs in ~3 ms.

In protein cryocrystallography, aside from plunge cooling in liquid nitrogen, it is also common to cool samples by inserting them into a flowing nitrogen gas "cryostream" at T=100 K. Cooling rates in gas streams are smaller than in plunge cooling, limited to <1000 K/s, but sometimes slower cooling can result in less sample damage during cooling.

Aside from protein crystallography and electron microscopy, cryopreservation is widely used in other areas of biotechnology and biological research, and samples preserved included biomolecular solutions (such as of proteins or antibodies used in medical therapeutics), single cells, larger volumes of cultured cells, tissue samples, and on up in size to whole organs. In typical applications the sample volumes cooled are too large to allow adequate heat transfer for cooling at rates from 10 K/s to 100,000 K/s. However, there is increasing interest in "vitrification" approaches to cryopreservation, which require smaller samples and faster cooling rates. The present invention could be very useful in these applications.

Ice Accumulation and Sample Frosting

Aside from controlling the temperature transition between gas and liquid cryogen, plunge cooling systems for protein crystals and other small samples must also prevent formation of frost ice on the sample during its cooling, in the liquid cryogen (where any ice crystals present may adhere to the sample), or on any cold surfaces that could potentially shed ice crystals onto the sample or into the liquid cryogen. Pre-existing ice can nucleate ice in the sample, as well as coat it in ice which can interfere with some kinds of measurements. For example, one potential application of plunge coolers is in preparing samples for cryogenic temperature small-angle X-ray scattering (SAXS). SAXS is extraordinarily sensitive to even minute amounts of ice.

SUMMARY

Aspects and embodiments of the instant invention include a cryogenic cooling manifold and methods incorporating a cryogenic cooling manifold for managing the gas layers above a liquid cryogen to control cooling temperature-time profiles and ice formation for samples that are plunged through the gas and into the liquid cryogen.

The embodied invention enables i) plunge cooling systems that yield the largest possible cooling rates for small samples, approaching 100,000 K/s even in liquid nitrogen; ii) variable rate cooling at rates down to 10 K/s or even smaller. The wide range of cooling rates—spanning a factor of 10,000—possible in a single device, enables optimization of cooling rates for each sample to achieve optimal cryopreservation, as defined by the appropriate metrics for each sample.

An aspect of the invention is a cryogenic cooling manifold. In an embodiment, the cryogenic cooling manifold includes an integral manifold body configured in such a manner to be disposed over a liquid cryogenic dewar, having a vertically oriented plunge bore extending through the manifold body from top to bottom, wherein a top end of the plunge bore is open, further including a plurality of supply and exhaust channels that intersect the plunge bore and a top surface of the manifold body, said channels including a vacuum channel, a gas make-up channel, and a dry gas supply channel that intersects the plunge bore perpendicular to a longitudinal axis of the plunge bore, to enable bore flooding. In various aspects and embodiments the cryogenic cooling manifold may be characterized by one or more of the following non-limiting limitations, characteristics, features, and attributes:

wherein the plurality of supply and exhaust channels and the plunge bore are rectangular in cross section;

wherein the plunge bore has a width dimension, $W_{PB}$, further wherein the plurality of supply and exhaust channels each have a width dimension, $W_{CH}$, wherein $W_{CH}=W_{PB}+/-10\%$ where they intersect the plunge bore;

wherein the plurality of supply and exhaust channels are inclined upwardly at an angle where they intersect the plunge bore with respect to a horizontal plane;

wherein the make-up gas channel is inclined at an angle of between 25° to 50° from the horizontal;

wherein the vacuum channel is inclined at an angle of between 10° to 55° below the horizontal;

wherein the make-up gas channel has a chamfer from 0.08 inches to 0.2 inches. on all edges of the channel;

wherein the dry gas supply channel intersects the plunge bore closer to the open end of the plunge bore than a cryogenic medium end;

wherein the vacuum channel intersects the plunge bore at a location opposite the intersection of the gas make-up channel;

further comprising a heater disposed on the walls that define the plunge bore wherein the apertures of the make-up gas channel and the vacuum channel intersect the plunge bore at the lower end of the plunge bore such that, in operation, the apertures extend down into the liquid cryogen, and the liquid cryogen thus forms the floor of the aperture and the plunge bore, extending back into the channels away from the bore;

wherein the vacuum channel and make-up gas channel are sloped where they intersect the plunge bore.

An aspect of the invention is a method for cryogenically cooling a microliter or smaller-sized sample. In an embodiment, the method includes providing a cryogenic cooling manifold, including: an integral manifold body configured in such a manner to be disposed over a liquid cryogenic dewar, having a vertically oriented plunge bore extending through the manifold body from top to bottom, wherein a top end of the plunge bore is open, further including a plurality of supply and exhaust channels that intersect the plunge bore and a top surface of the manifold body, said channels including a vacuum channel, a dry gas make-up channel, and a dry gas supply channel that intersects the plunge bore perpendicular to a longitudinal axis of the plunge bore, to enable bore flooding; and disposing said cryogenic cooling manifold over a liquid cryogenic medium such that a surface level of the liquid cryogenic medium is at least partially above the floor of the make-up gas channel and the vacuum channel where they intersect the plunge bore. In various aspects and embodiments the method may be characterized by one or more of the following non-limiting limitations, steps, characteristics, features, and attributes:

--- further comprising flooding the plunge bore with a dry gas immediately prior to a sample plunge command;
further comprising flooding the plunge bore with a dry gas;
further comprising, after the sample plunge command, the following sequence:
stopping the plunge bore flooding;
applying vacuum to the plunge bore;
providing a make-up gas to the plunge bore; and
vertically translating the sample into the liquid cryogenic medium at a controlled rate;
further comprising:
stopping the evacuation;
stopping the supply of the make-up gas; and
flooding the plunge bore with the dry inert gas;
further comprising intermittently evacuating the plunge bore and supplying the make-up gas in a timed manner;
further comprising controlling a thickness of a cold gas layer in the plunge bore immediately prior to the sample plunge command for slow and/or variable rate cooling.;
further comprising moving the sample through the plunge bore at a non-uniform plunge rate.

---

BRIEF DESCRIPTION OF THE DRAWINGS

FIG. 10. Schematic illustration of operations during plunge cooling of a sample in liquid nitrogen, where the cold gas in the bore is removed. FIG. 10(A) Before the plunge, the bore flood gas is on. FIG. 10(B) Bore flood gas off, then vacuum on, then make-up gas on.

FIG. 10(C) Sample plunge through bore into liquid cryogen. FIG. 10(D) Plunge is complete, vacuum and make-up gas off, and bore flood resumed.

FIG. 11. Schematic illustration of operations during cooling in the bore gas. The bore wall heaters (black rectangles) may be off, to give a cold gas layer, near the temperature of the liquid cryogen at its bottom; or they may be on to change the vertical temperature gradient in the bore gas, or to heat the bore gas to some intermediate temperature, for precooling the sample before it enters the liquid cryogen. FIG. 11(A) The bore flood gas is initially on to prevent ice formation and frosting. FIG. 11(B) Bore flood gas off Bore heaters off or set to reduced power to achieve desired bore temperature. FIG. 11(C) Sample translated at speed determined by desired cooling rate through bore gas. FIG. 11(D) Sample translated into the liquid cryogen, and bore flood resumed. Small bore flood gas, vacuum, and make-up gas flows can also be used before and during the sample translation to modify temperature profiles in the gas present in the bore to obtain a desired temperature profile.

DETAILED DESCRIPTION OF EXEMPLARY, NON-LIMITING EMBODIMENTS OF THE INVENTION

Figure 1:
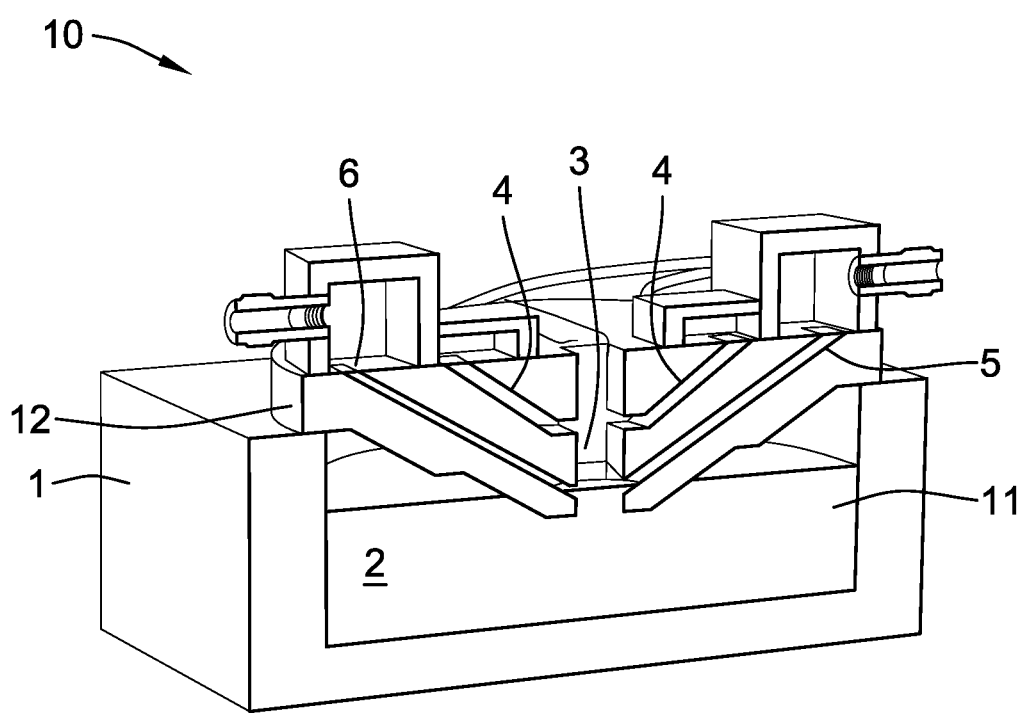
FIG. 1. Section view of a manifold according to an exemplary embodiment of the present invention. (1) Insulated container for liquid cryogen (e.g., liquid nitrogen) (not part of the invention per se); (2) liquid cryogen at a controlled level (not part of the invention per se); (3) plunge bore of manifold; (4) dry gas (e.g., room temperature $N_2$) blanket supply channel; (5) dry gas make-up supply for cold gas layer removal; and (6) vacuum/suction channel for cold gas layer removal. ((1) and (2) are shown to indicate that the manifold projects downward into the liquid cryogen in the immediate vicinity of the plunge bore, creating an isolated liquid cryogen surface and gas volume (the plunge well), and isolating the rest of the cryogen surface and gas above it outside the bore from contact with gas and moisture that may enter through the bore).

We consider a trajectory of a sample as it is plunged from an initial position, at some initial height H above the liquid cryogen surface, to a final position at depth D below the liquid nitrogen surface. This trajectory takes the sample through whatever gas exists between the sample's initial position and the surface of the liquid cryogen. The temperature profile in that gas and the speed and size of the sample determine the amount of cooling of the sample by the gas as it is plunged along the path between the initial sample position and the liquid cryogen surface.

In general, the gas above (nearer to) the liquid cryogen surface will be cooled below the ambient gas temperature by thermal conduction, convection, and radiation due to its proximity to the liquid cryogen, and also due to boil off or evaporation of the liquid cryogen. A cold gas layer thickness can be defined as the thickness of the gas whose temperature is below some threshold temperature $T_t$. In cryopreservation, this might be the freezing temperature of pure water, 0° C., or its homogeneous nucleation temperature, $T_h$, or the freezing temperature of the aqueous solvent mixture present in the sample (which may, e.g., contain a cryoprotectant like glycerol), or some other temperature at which, e.g., important physico-chemical changes may occur in the sample.

We disclose herein experiments using a variety of configurations that inform the design of optimized manifolds for managing the transition of biological samples between initial conditions in air (or another gas or vacuum), typically at or near room temperature although possibly at an intermediate temperature such as 4° C. or 0° C. or −20° C., and liquid cryogens held in insulated containers, for the purpose of cryopreservation. A feature of the embodied manifolds is to allow the fastest possible cooling of small biological samples such as protein crystals, crystals of other biomolecules or biomolecular structures for use in X-ray crystallography and X-ray diffractive imaging, as well as cooling of liquid samples for small-angle X-ray scattering, and of single cells, tissue samples, and other biological samples. Another feature allows variable rate plunge cooling using deliberately trapped cold gas above the liquid cryogen. A third feature prevents formation and accumulation of frost and ice in the liquid cryogen, on the surfaces of the manifold, and on and in the sample itself.

Initial experiments.

In initial, preliminary experiments, several different configurations for controlling and removing the cold gas layer using streams of dry nitrogen gas were tested. Initial tests simply used a gas jet from a 1 cm nozzle directed at different angles relative to a liquid nitrogen surface in an uncovered open-mouth dewar. With steady gas flow, a minimum flow rate of ~10 liters per minute was required for reliable gas removal. This allowed 10 hours of continuous running using a standard 43 liter high-pressure $N_2$ cylinder, but increased the rate of liquid nitrogen consumption due to evaporation from ~0.4 l/hr to 2.2 l/hr.

In a second tested configuration, a simple manifold constructed of foam core board and thin plastic sheeting converted an input gas stream into a laminar flow (using a diffuser and multiple small tubes to latterly confine the flow) of width ~2 cm directed nearly tangential to the liquid interface, and then carried this gas up and away from the plunge region. In this geometry, only a small volume of cold gas near the plunge path must be removed, and only a small surface area of the liquid nitrogen is exposed to warm flowing gas, reducing consumption of both dry gas (to ~2.5 l/min) and liquid nitrogen. $N_2$ gas and liquid consumption were further reduced using a pulsed rather than continuous gas source. Maximum cooling rates, equal to those obtained with continuous flow, were obtained by beginning gas flow only 0.5 s before the plunge. 0.5 s of flow corresponds to an $N_2$ gas volume of only 0.13 liters. A 3.6 liter $N_2$ cylinder (length=14 inches) is then sufficient to cool ~4,000 samples. Alternatively, this volume of gas could be generated in 0.5 s by boiling 0.2 ml of liquid nitrogen using a 60 W heater. Measurements showed that the cold gas layer completely reformed within 0.5 s after the warm gas flow is terminated, so the gas layer must be removed prior to each plunge.

Initial crude tests showed that variable rate cooling could be obtained by trapping a fixed thickness layer of cold gas above the liquid nitrogen surface, and then translating the sample through this gas layer at suitable speed.

A major problem in this initial work was the condensation and freezing of water vapor on the liquid cryogen surface, on the sample, and on cold system components. This leads to ice accumulation and sample contamination that, in humid lab environments, limits the useful operation time before the system must be warmed and dried out. This suggested that the liquid nitrogen surface area that is ever exposed to room air should be minimized, exposure times of the liquid cryogen surface to warm moist air should be limited using shutters or other means, and other cold surfaces should be insulated and/or equipped with heaters.

A major challenge then was to design a manifold between the initial sample position in ambient air (or in a sample environment chamber) and the liquid cryogen that manages cold gas layers and moisture but that does not interfere with sample plunging or post-plunge handling and storage. The manifold should also prevent users from direct contact with the liquid cryogen, including due to splashing that occurs in high-speed plunges.

Detailed exploration of design parameters and performance.

Design, prototyping, and extensive testing were performed on multiple design variations of the manifold for managing cold gas and moisture. Various methods were used to visualize gas flows including the addition of tracer particles.

Figure 2:
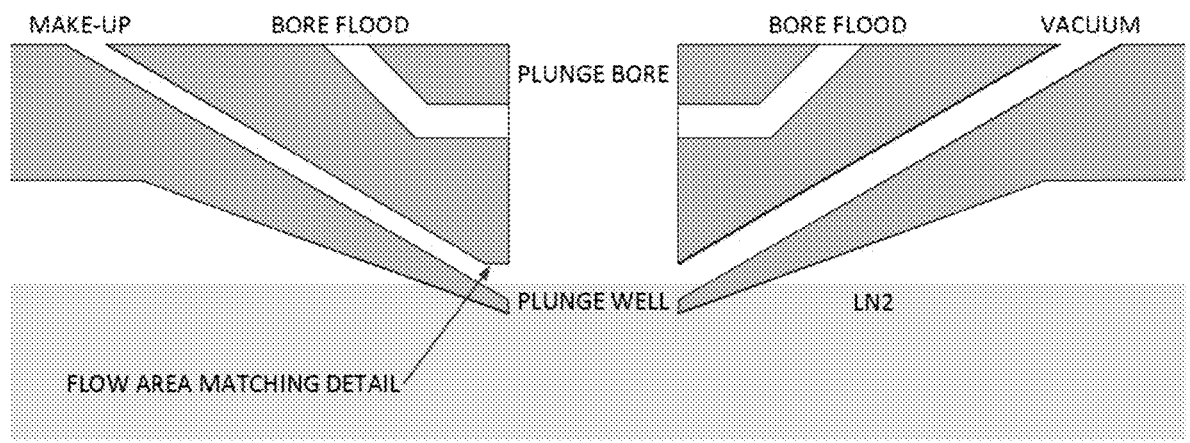
FIG. 2. Cross section view of the lower portion of the manifold, showing the configuration of channels for vacuum, make-up, and bore flood gas flows, according to an illustrative embodiment of the invention.
Figure 3:
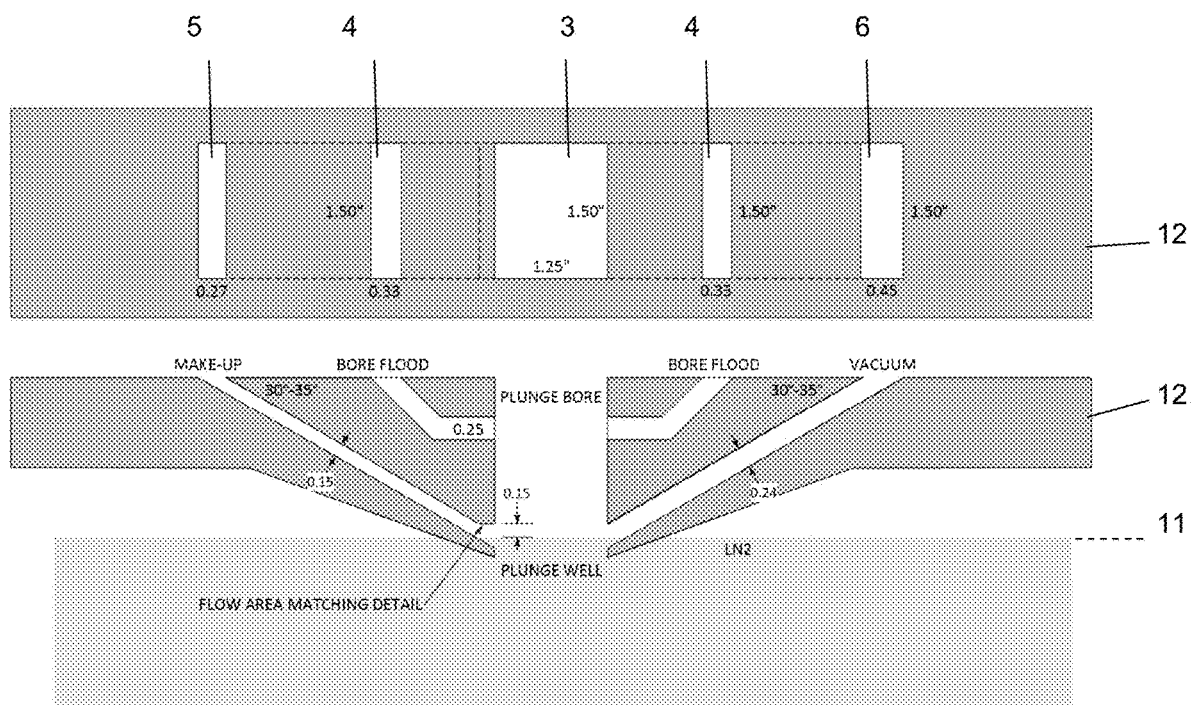
FIG. 3. Top and cross section view of a manifold with example dimensions in inches, according to an illustrative embodiment of the invention.

FIG. 1 shows a manifold 10 disposed on top of an insulated container 1 holding liquid cryogen 2. Referring to FIGS. 1 and 2, the manifold 10 comprises an integral manifold body 12 that is advantageously constructed from a suitable foam or ceramic material to provide, among other things, support, stability, and importantly insulation between a liquid cryogen and the ambient environment. The manifold body 12 has somewhat of an inverted pyramid shape as discerned from the figure and includes a centrally located, vertically oriented plunge bore 3 extending through the manifold body from top to bottom. Referring also to FIG. 3, the manifold body includes a plurality of channels that intersect the plunge bore and provide apertures in the top of the manifold body for supply and exhaust of gases as described herein below. The channels include two dry gas (as well understood in the art; e.g., $N_2$) supply channels 4

(for bore flooding) that intersect the bore closer to the ambient environment (above the manifold) end than the cryogenic medium end, a dry gas make-up channel 5 that intersects the plunge bore at the cryogenic medium end (see FIG. 2), and a vacuum channel 6 that intersects the plunge bore at the cryogenic medium end opposite the make-up channel 5. As illustrated in FIG. 3 (and discussed in greater detail below), all of the channels advantageously are rectangular in cross section, as is the plunge bore. Moreover, the fluid (gas) and vacuum channels are inclined upwardly at an angle with respect to a horizontal plane of the surface of the cryogenic medium. The bore flood gas supply channels 4 intersect the plunge bore perpendicular to or normal to the vertical, longitudinal axis of the plunge bore, as this provides advantageous characteristics such as, reduced gas agitation, elimination of ice formation, and others.

Importantly, the manifold geometry, dimensions, and design characteristics are such to ensure that, in operation, when the manifold is operationally disposed on a dewar (1) containing a liquid cryogen (2), that the bottom end of the plunge bore as well as a partial region of the make-up and vacuum channels where they intersect the plunge bore, are in contact with the cryogenic medium. In this manner, there is substantially complete isolation of the cryogenic medium from the ambient environment (except through the top opening of the plunge bore and a small intentional nitrogen gas vent), thus allowing control of the gas layer(s) within the plunge bore and preventing humid gas that may enter the plunge bore from reaching the surface of the liquid cryogen outside the bore The manifold is designed to (a) maximize cooling rates; (b) maximize cooling rate repeatability; (c) minimize cold gas layer thickness for rapid cooling profiles; (d) manage and structure a thick cold gas layer for variable-rate cooling; (e) keep the sample at room (or some intermediate) temperature until entry into the liquid cryogen; (f) minimize sensitivity to liquid cryogen level; (g) minimize liquid cryogen usage; (h) minimize condensation of water vapor; (i) minimize ice de-sublimation; and (j) minimize liquid cryogen level fluctuations at the sample entry point due to surface waves caused by boiling, vibration, etc.

Technique and Design Details

FIGS. 1-7 show principal design details for plunge cooling manifolds.

Deliberately trapping a cold gas layer above the liquid cryogen surface (shown in FIG. 1 as dotted line 11) and below the manifold in areas other than the plunge bore significantly reduced heat flux into the liquid cryogen through the manifold and liquid cryogen boil-off rates, as well as reducing ice formation within the liquid cryogen filled sample cooling and storage container.

Ensuring a tight seal (i.e., environmental isolation) between the manifold 10 and the liquid cryogen container 1 (except for the plunge bore and a small intentional nitrogen gas vent) prevents all outside air from coming in and forming ice on and in the liquid cryogen, which may contaminate samples. The continuous boil-off of the liquid cryogen continuously purges the internal gas pocket between the liquid cryogen and the manifold.

Turbulence and cooling irreproducibility were reduced by sloping all surfaces outside the plunge bore upward and away from the plunge bore and well, so as to guide any bubbles generated by boiling of the liquid cryogen (the major source of surface turbulence in the case of liquid nitrogen) away from the plunge well. Flooding the bore from passages distinct from and above the vacuum and make-up gas passages (dry gas supply 4), which are designed to generate a "scrubbing" laminar flow immediately above the cryogen surface also reduced or eliminated ice formation by keeping the bore and the area just above it purged of moisture-contaminated ambient air.

Use of the smallest width plunge bore and well that conveys advantageous gas flow characteristics minimizes adverse effects of turbulence and ice formation while ensuring removal/scrubbing of cold gas. By maintaining a rectangular or square profile down the bore, turbulence in the bore and across the liquid cryogen surface can be minimized, as the most advantageous flow is one that goes down the bore and turns over the liquid cryogen surface in a specific manner. A bore with a rounded shape would produce a different rate flow across different parts of the liquid cryogen surface within the well.

Gas flow down the bore is an important part of the scrubbing mechanism. If all scrubbing flow was provided solely by the vacuum and make-up gas, the flow touching the surface of the cryogen would produce excessive new cold gas. If no make-up gas is used, the flow over the cryogen surface would not be sufficiently laminar or sufficiently close to the surface at the plunge point to produce consistent rapid cooling.

Gas flowing down the bore (e.g., from the bore flood passages) will advantageously turn 90° at the bottom of the bore to enter the vacuum port, leaving a dead/still/stalled gas pocket against the bore wall opposite the vacuum port 6 (as well as one just above the vacuum port), above the make-up gas port 5. When the bore is the correct size and shape, this stalled gas will act as a deflector and steer the gas pulled down the bore by the vacuum to scrub the $LN_2$ surface just at the plunge point. Driving this scrub flow solely with pressure from the make-up gas passage causes too much turbulence, and produces unnecessary additional cold gas via surface boil-off.

Bore dimensions (wall widths) advantageously are between 1.25 inches and 2 inches. A bore that is too small (e.g., smaller than 1.25"×1.25") does not allow space for the stalled gas, causing the dry flood gas flowing down the bore to never flow across the surface of the cryogen—it stacks up above the cryogen surface. A bore that is too large (e.g., larger than 2"×2") won't scrub the vacuumed flow across the whole surface of the liquid cryogen in the well, because the flow will be too slow, the stalled gas area will be too far away from the plunge point to push down and stabilize the flow there, and new cryogen (especially when $LN_2$ is used) will boil off the surface between the regions of effective scrubbing and the plunge point.

Keeping the bore sufficiently small (within the specified range) lowered the amount of cold gas that must be removed and the mixing of ambient air into the plunge well when open. A small plunge well was also found to force the vacuum-generated flow to remain laminar and to more effectively scrub the surface of the liquid cryogen of cold gas, and to minimize splashing out of the well generated by the sample plunge and subsequent cryogen boiling. However, a plunge well bore that is too small can act as a gas cylinder and the sample assembly as a piston during the plunge, causing gas turbulence at the plunge point, and depression and then oscillations of the liquid cryogen level.

In an exemplary embodiment the plunge bore walls are comprised of a heated stainless steel sleeve. The bore heating is driven by a PID or adaptive digital controller in order to manage heat flux scenarios during different operating modes (e.g., fast plunge cooling versus slower cooling in a gas layer) of the device. During and just after the sample plunge, the heat flux requirement is increased due to cryogen splashing. The minimum heat flux requirement is 50 W. The heater must survive repeated cycling between room temperature and cryogenic temperature, and a flexible Kapton heater was found to be suitable. The heater controller is set to achieve bore wall temperatures slightly above ambient, in the range of 80° F. to 100° F.

Heating of the plunge bore provides multiple important benefits:

Heating prevents cold gas from building up in the bore between plunges, without use of consumables like $N_2$ gas or continuous drawing-in of moisture-laden ambient air via vacuuming of the bore.

Heating prevents the walls of the bore from cooling due to radiative cooling to the cryogen and due to conduction via the surrounding cold material.

Heating the bore also prevents radiative cooling of the sample in the directions of the bore walls.

Heating prevents condensation or ice formation in the bore.

The depth and aspect ratio of the bore shields the gas layer from ambient air currents. The depth:width ratio is advantageously 1.1:1 to 1.4:1. The bore depth (including the submerged portion) is 2.4 inches in an exemplary device. The bore depth compared to bore top and/or bottom opening surface area has a strong influence on the resistance of the gas within the bore to perturbation by stray air currents from the ambient environment. Together with bore heating that prevents condensation or ice formation, this obviates the need for a door that seals the top entrance to the bore and that opens just before each plunge. This is a significant simplification in the mechanical design of plunge coolers. The depth ratio also minimizes splashing of cryogen both from the impact of the sample during the plunge and the vigorous boiling that follows the plunge until the sample has cooled to near the cryogen's boiling point.

The depth and aspect ratio of the bore allows a controllable thick cold gas layer for slow and/or variable rate cooling. By reducing or eliminating the vacuum and/or make-up gas flows, and/or by altering the vacuum and make-up gas timings relative to each other and relative to the plunge, and/or by reducing the bore flood gas flow, and/or by controllably reducing or eliminating the bore heating, a column of cold gas of various characteristics (temperature and temperature gradient) can be built up in the bore. The cold gas can range from a homogeneous very cold (temperature comparable to that of the liquid cryogen) layer that is not removed, to a column that is warm on top to cool on the bottom with just a small amount of cold gas left at the bottom of the bore. The plunge rate can be varied from stopping in the cold gas, a very slow traversal through the cold gas, or traversing up to the maximum plunge speed of the unit. In this way, the manifold combined with a variable speed sample translation mechanism allows cooling of microliter to sub-nanoliter samples at rates from 1 K/s up to 100,000 K/s. The largest rates are orders of magnitude larger than those achieved in, e.g., commercial devices used for cryostorage of gametes and liquid biological samples in straws, centrifuge tubes or cryovials with volumes in the milliliter and larger range.

Pre-plunge dry gas bore flooding prevents and/or minimizes ambient air mixing (and subsequent condensation and ice formation) during the plunge. The bore flood gas volume flow in an example device is 3 SCFH (standard cubic feet per hour) and has an advantageous range from 1 to 5 SCFH. Except during sample translations through the bore for cooling, the bore flood gas flow is maintained at all times when the unit is operational (although certain types of slow cooling can maintain a reduced bore flood during sample translations. A typical sequence of operations is: (1) plunge command, (2) bore flood off and vacuum on, 3) make-up gas on, 4) plunge, 5) vacuum, make-up gas off, bore flood on. Providing a dry gas bore flood just prior to a sample plunge fills the bore and floods the area above the bore with dry gas such that dry gas is dragged down into the bore and against the liquid cryogen at the plunge point, not ambient air containing moisture. This greatly reduces ice formation on the sample, the bore walls, and on/in the liquid cryogen. The bore flood is shut off during the plunge because even very gentle flow disturbs the stability of the cold gas layer removal at the plunge point during the plunge. Flooding the plunge bore is an important as it minimizes the volume of gas that needs to be removed, constrains the gas flows to the necessary area, keeps the plunge well from forming a 'vent point', and minimizes cold gas escaping into the bore.

Ambient air or dry gas make-up or bore gas impingement should be controlled because any flow onto or across the liquid cryogen with a significant vector towards the surface, or any turbulent flow (which will have random vertical vector components) will immediately generate significant quantities of cold gas. The make-up gas port 5 and channel are carefully designed to avoid this impingement. The width of the gas channel near the bore should match the width of the bore (+/−10%). This rectangular shape encourages laminar flow and prevents dead spots. The shape and angle of the passage were derived to present a smooth laminar flow to the surface with enough downward component to aid cold gas layer scrubbing without generating significant new cold gas. The make-up gas passage angle of attack should be within the range of 25° to 50° (inclined from the horizontal). The vacuum channel's angle of attack near the bore should be within the range of 10° to 55°. The make-up gas channel includes a 0.08" to 0.2" chamfer at its opening into the bore to encourage appropriate gas flow; the chamfer maintains a constant area passage so the gas flow is not accelerated onto the liquid cryogen surface and acts as a passive flow director to help the flow turn parallel to the cryogen surface. Both the vacuum and make-up gas channel floors slope down below the surface of the liquid cryogen, such that the port floor is actually formed by the liquid surface. This conveys two important attributes: (1) any distance between the port floor and the liquid surface limits how close to the liquid surface the cold gas layer can be removed; and (2) the cold gas removal action is allowed to function effectively across a range of liquid fill levels.

The bore flood channels and ports are designed to avoid directing gas flow toward the cryogen surface by having the channels adjacent to the bore run horizontally, perpendicular to the bore. The width of the bore flood port should be +/−25% the bore width. The channel height adjacent to the bore and its port height should be in the range of 0.2 to 0.3 inches. The channels near the bore and the ports are sized such that they are large enough that the required gas flow will flow at a low enough velocity so that mixing and turbulence in the bore is minimized, but small enough that flow going down the bore before and during a plunge does not impinge excessively on the ports and create turbulence.

Vacuum is used as the primary cold gas layer removal method because a smooth drawn flow creates a much more stable area of near-total cold gas removal than does blowing across the surface. Fast cooling results are improved by the use of some make-up dry gas flow, as is the reduction in the amount of potentially ambient-contaminated gas which flows down the bore, but the key purpose of the make-up dry gas flow is to aid stability. Too much make-up flow will create large quantities of fresh cold gas, and will kick cold gas up above where the vacuum port can remove it. With no make-up port (using a vertical or sloped bore wall opposite the vacuum port), or a port flowing too much or too little $N_2$, the drawn gas flow either does not effectively scrub the cryogen surface, or impinges too strongly and generates fresh cold gas. A primary parameter of the vacuum port is the height of the top of the gas port and channel above the liquid cryogen level. The channel and port height at the bore is 0.25 inches, with the liquid cryogen surface advantageously 0.075 inches above the channel floor, giving an effective port height of 0.175 inches. An advantageous cryogen surface level range with this port height is 0.05 to 0.1 inches. The vacuum port height range can be 0.15 to 0.3 inches. If the port height is above the stated range, the cold gas layer is not removed down to the surface of the cryogen (regardless of flow rate). If it is below the stated range, the minimum volume flow rate that can clear the bore and the surface excessively distorts the surface of the cryogen, spoiling the smooth cryogen surface and defeating effective removal and reliable sample cooling.

Pulsed vacuum and make-up gas flows improve efficiency. Properly timed and balanced vacuum and make-up gas flows proved most effective at eliminating the cold gas layer to within <0.3 mm of the liquid cryogen surface and also allowed for minimal dry make-up gas consumption of 0.023 cu. ft. per plunge, allowing over 900 plunges per small 22 cu ft. (18" tall) $N_2$ cylinder.

Figure 4:
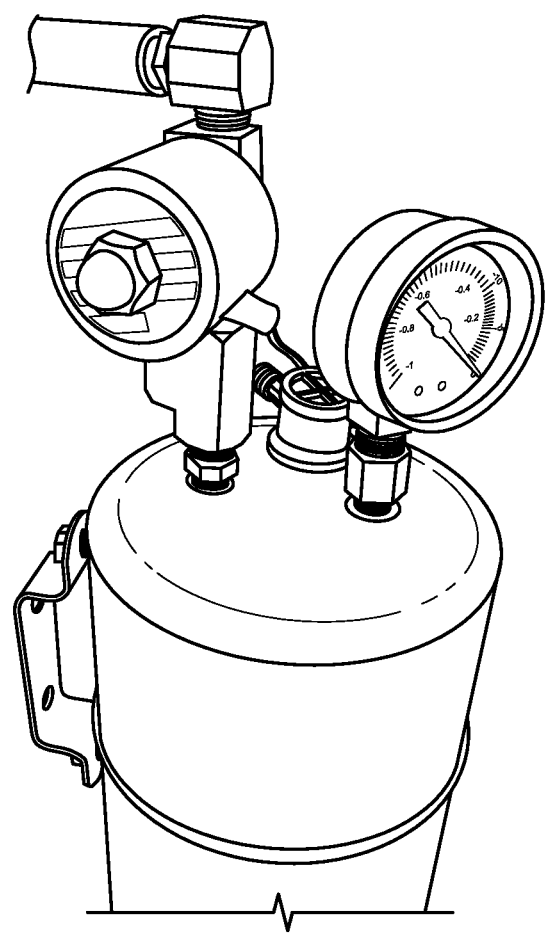
FIG. 4. Photograph of a vacuum reservoir assembly with connections to the vacuum channel in the manifold and to a pump or other suction/vacuum generating device showing a solenoid that is timed and driven by software to open at the correct time for effective vacuum at the moment of plunging.
Figure 5:
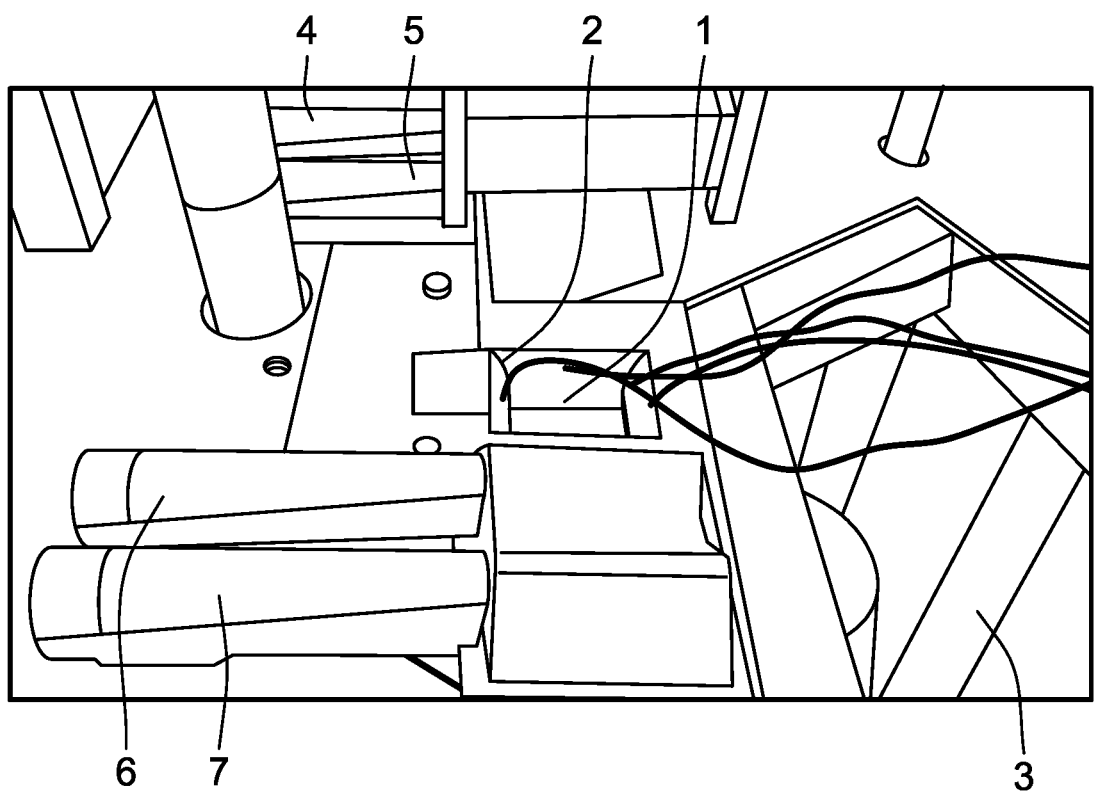
FIG. 5. Photograph of a prototype manifold assembly from above, which contains the plunge bore/plunge well. The square hole in the center (1) is the plunge bore, with (2) prototype bore heaters attached to the bounding walls of the bore visible. The open area to the right (3) is the sample puck access hatch to the liquid cryogen filled insulated container below (not part of the invention per se). The four manifold connections pointing to the left are (from far to close) (4) Make-up $N_2$ gas line; (5) Bore flood $N_2$ gas line 1; (6) Bore flood $N_2$ gas line 2; and (d) Vacuum line.
Figure 6:
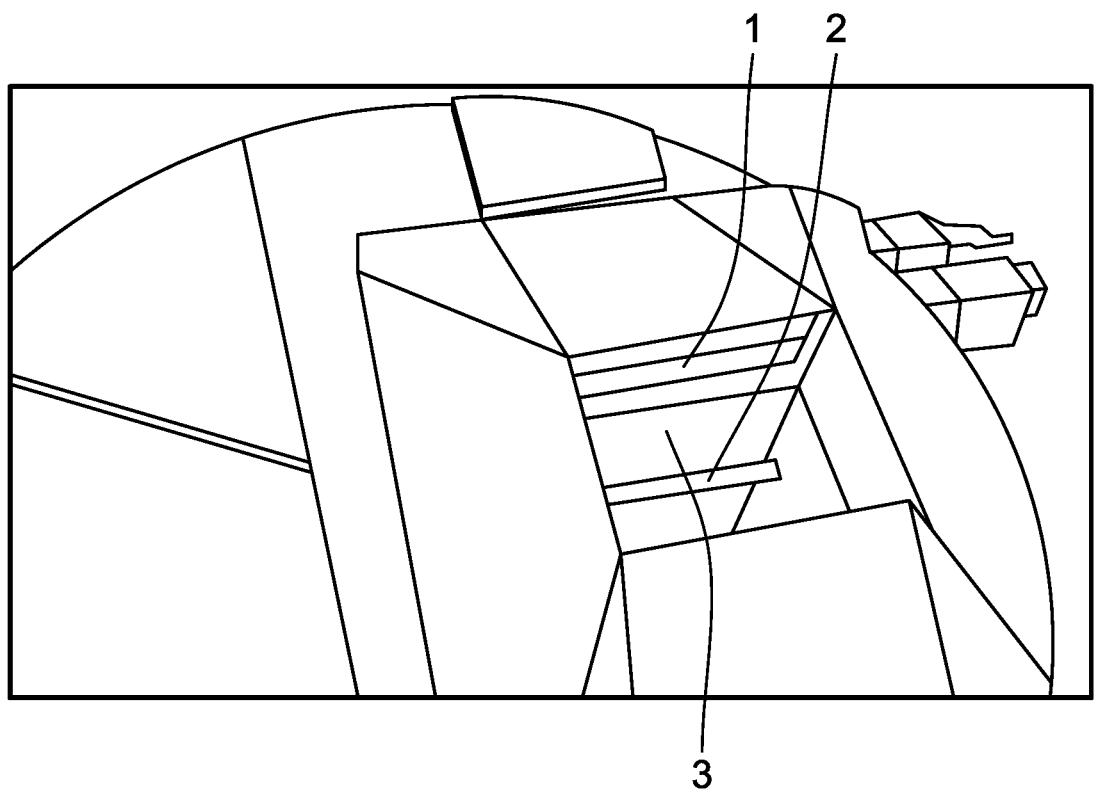
FIG. 6. Photograph of the lower side of a prototype manifold assembly, showing the plunge bore (the large rectangular hole), channels/ports for (1) $N_2$ make-up gas and (2) bore flood $N_2$ gas port 1, and (3) the bore heaters.
Figure 7:
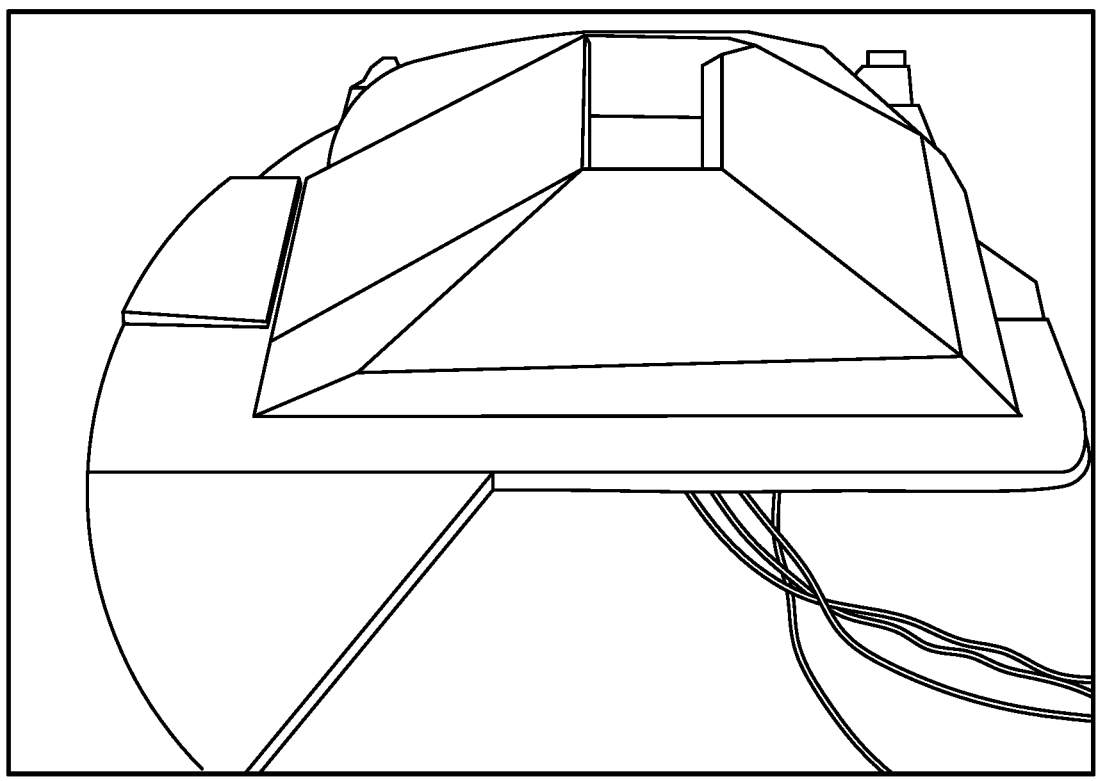
FIG. 7. Photograph of the lower side of a prototype manifold assembly, showing the structure of the lid for the liquid cryogen container and the plunge bore that dips down to below the liquid cryogen level.

FIG. 4 shows an example configuration of solenoid valve and a vacuum reservoir (which ensures smooth and continuous vacuum during pulsed operation.) Leaving the sample bore quiescent between plunges reduces turbulence and frosting.

Configuring the vacuum and make-up gas channels so that the liquid cryogen surface forms the bottom of these passages adjacent to the bore, and sloping the bottom of these passages toward the cryogen surface ensures all gas flows flow across the surface of the cryogen, and minimizes the disruption caused by a changing cryogen level.

Now we will describe a particular implementation of the invention that gives values and ranges for important design parameters.

A specific design for the gas management manifold is shown in FIG. 3. Comments on specific features of this design:

- All gas channels are advantageously rectangular in cross-section. A channel with another shape such as rounded would produce a different rate flow across different parts of the liquid cryogen surface, which imposes plunge and flow reproducibility challenges; forming a small quiescent area with a very thin cold gas layer is not sufficient for reproducibility.
- The angle of the make-up gas passage 5 is a parameter advantageously set between 25 and 55 degrees from the horizontal (with an exemplary device using 38 degrees). If the angle is too steep, gas flow impacts the liquid cryogen too vigorously and generates new cold gas; if the angle is too shallow, an insufficient scrub is provided. Excessively shallow angles also place more of the length of the gas channel in close proximity to the liquid cryogen, potentially cooling the gas within and making it more difficult to provide warm gas to the surface. The angle of the majority of the vacuum channel is not critical. However, the angle of the channel floor under the liquid cryogen if too steep will increase sensitivity to small liquid cryogen level changes. The suitable range is 10 to 55 degrees, with the current instantiation set to 38 degrees from the horizontal.
- The vacuum system is arranged, and flows are restricted such that a high degree of pressure differential and a high velocity flow are not formed at the vacuum port. Much of the required restriction is achieved by the selection of tubing size connecting the solenoid valve used to control the vacuum flow to the port, and by the solenoid valve itself. High velocity flow rates during testing did not give as smooth or stable flows across the liquid nitrogen/cryogen surface, and could distort the cryogen surface. A strong pulse at the port when the valve opens or closes would cause turbulence inside the bore, and cause cryogen to be pulled into the vacuum system, temporarily blocking the port. An exemplary device regulates the vacuum flow to be 100 SCFH (port velocity of about 11.5 ft/s with a 2 inch×2 inch bore) with a useful range of about 70 SCFH to 150 SCFH. An embodiment uses a vacuum channel with multiple slopes such that the linear distance across the manifold between the ends of the channel is reduced. The vacuum port at the bore intersects at the angle and in the manner as previously specified, but then turns sharply vertical or more steeply (60 degrees to 90 degrees; see FIG. 1) such that the exhaust end of the vacuum channel can be located closer to the bore, minimizing the size of the portion of the unit that contains the bore and gas channels.
- The design provides consistent reliable cold-gas removal with a liquid cryogen surface level variation (up into the plunge well) of 0.05 inches. This limited variation is imposed at the low end by needing to keep the floor of the channel covered in the liquid cryogen, and at the high end by the liquid surface excessively restricting the port.
- As the effect of the vacuum and make-up gas across the surface of the plunge well will taper at positions closer to the 1.25" length bore walls (as the gases travel from left to right in FIG. 3) the passages should extend close to +/−10% of the full width of the bore; any 'un-scrubbed' surface will allow pockets of cold gas to be pushed around in the bore due to unavoidable small amounts of turbulence before the plunge and turbulence generated by the plunge operation. These cold gas pockets can be pushed to or above the plunge point (where the sample enters the liquid cryogen), lowering the cooling rate and decreasing repeatability.
- The size of the bore flood passages are not critical. To flood the entire bore, the port width in the bore is advantageously within 25% of the bore width. To avoid drawing gas up the bore or forcing gas against the liquid cryogen, it is advantageous if the channels intersect the bore at a right (90 degree) angle.
- The exact vertical position of the bore flood ports in the bore walls is not critical. A useful range in an exemplary device with a 2.4 inch deep/high bore is between 0.5 inches to 1.25 inches down from the top of the bore. This is far enough down from the top of the bore that ambient air can be expelled upwards and some flood gas will travel downwards to due flow resistance, and high enough in the bore that there is not a single low area not covered by the heaters and stainless steel heated insert. If the flood ports are close to the vacuum and make-up ports, there will be a large unheated or under-heated area, because the cutouts in the bore heat insert for the flood and vacuum/make-up ports will all be close to the bottom of the insert, and insufficient heat will be able to flow from the un-ported portion of the insert. (Only narrow sections of stainless steel will connect the heat insert below the ports to the sides of the insert with no ports).

The draw (flow) up the vacuum passage must be greater than the flow down the make-up gas passage. If not, new cold gas generated by the dry gas (e.g. $N_2$) will build up over the plunge point, vertically reaching a few millimeters.

The flow down the make-up gas channel must be constant and non-turbulent. Early versions of the manifold used a porous diffuser to ensure proper flow characteristics. The latest embodiment uses a manifold design built into the portion of the unit near the bore that provides a suitable feed.

Best results for our bore and vacuum/gas channel dimensions stated previously and flow rates have been found with a make-up gas flow rate of 15 SCFH (Standard Cubic Feet per Hour) (velocity approximately 1.73 ft/s) with an estimated vacuum flow rate of 100 SCFH (flow velocity of about 11.5 ft/s). Best results have been found where the vacuum flow is started a minimum of 10 milliseconds before the make-up flow. The vacuum flow may start more than 10 ms before without negative effect except for increased draw of ambient air.

The bore flood must be turned off before the vacuum and make-up gas are activated.

There does not need to be a delay between flood turn-off and vacuum/make-up turn-on. Flood may be turned on immediately after the plunge.

The minimum timing required relative to sample entry into the liquid nitrogen/cryogen is vacuum 100 milliseconds before entry. This timing is based on establishing a clean, steady flow across the liquid cryogen surface Manifold Construction The manifold is an integrated design combining plunge bore/well, gas channels, bore heater insert, bore heater, and insulation of the interior of the liquid cryogen container from ambient heat. The main insulating component between the liquid cryogen and the manifold and lid is the trapped cold gas above the cryogen, with no part of the manifold other than the plunge well touching the liquid. The manifold material itself (1 inch of 4 lb cross-linked polyurethane foam on an initial prototype, 0.38 inches of 41 lb polyurethane tooling board in a current exemplary device) provides the remainder of the insulation in the manifold. Since the heat transfer rates through the gas above the liquid cryogen are small (especially since there is little gas turbulence to mix the naturally stratified temperature layers, warm near the warm manifold/lid) and since there is minimal material touching the liquid cryogen, a broad range of foam, composite, or ceramic materials are acceptable for the manifold construction. The lid that supports the manifold, covers the top of the liquid cryogen container, and seals to the container is insulated in its regions beyond the manifold by the gas layer, a 0.25 inch layer of G10 fiberglass, and a 0.56 inch layer of 2 lb density crosslinked polyurethane foam in an exemplary device.

Figure 8:
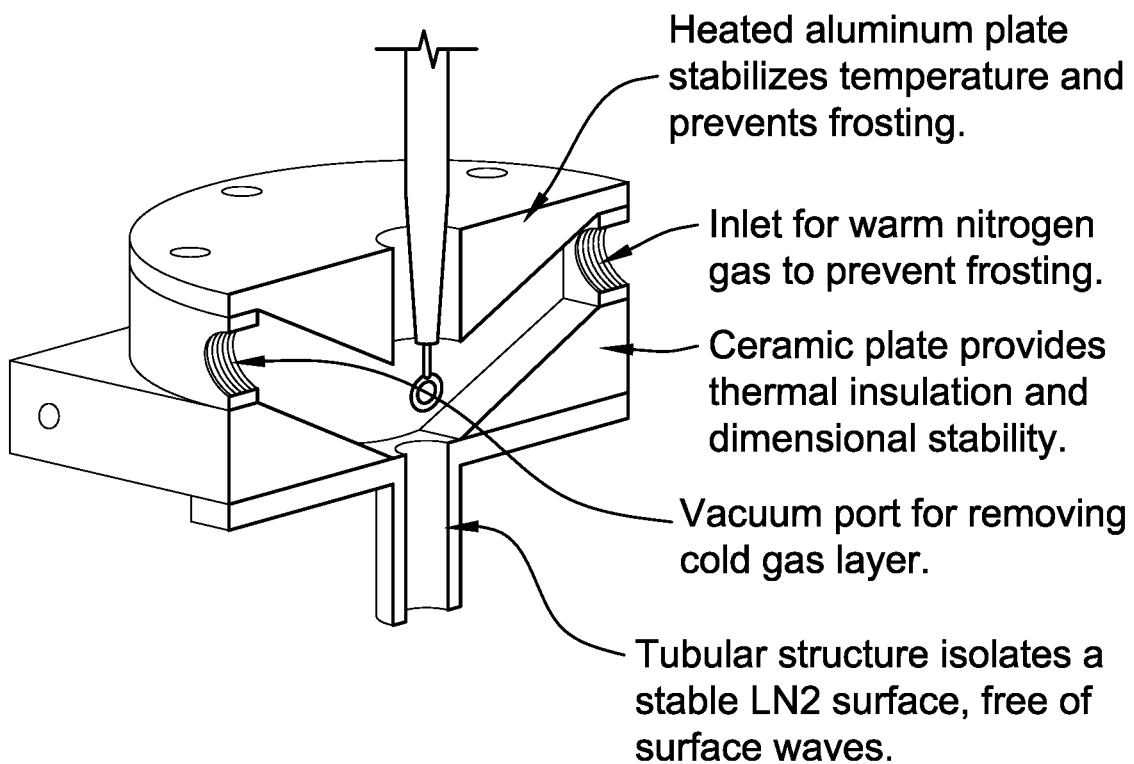
FIG. 8. Schematic sectional view of an alternate manifold assembly design, using metal and machinable ceramic components, according to an illustrative aspect of the invention.
Figure 9:
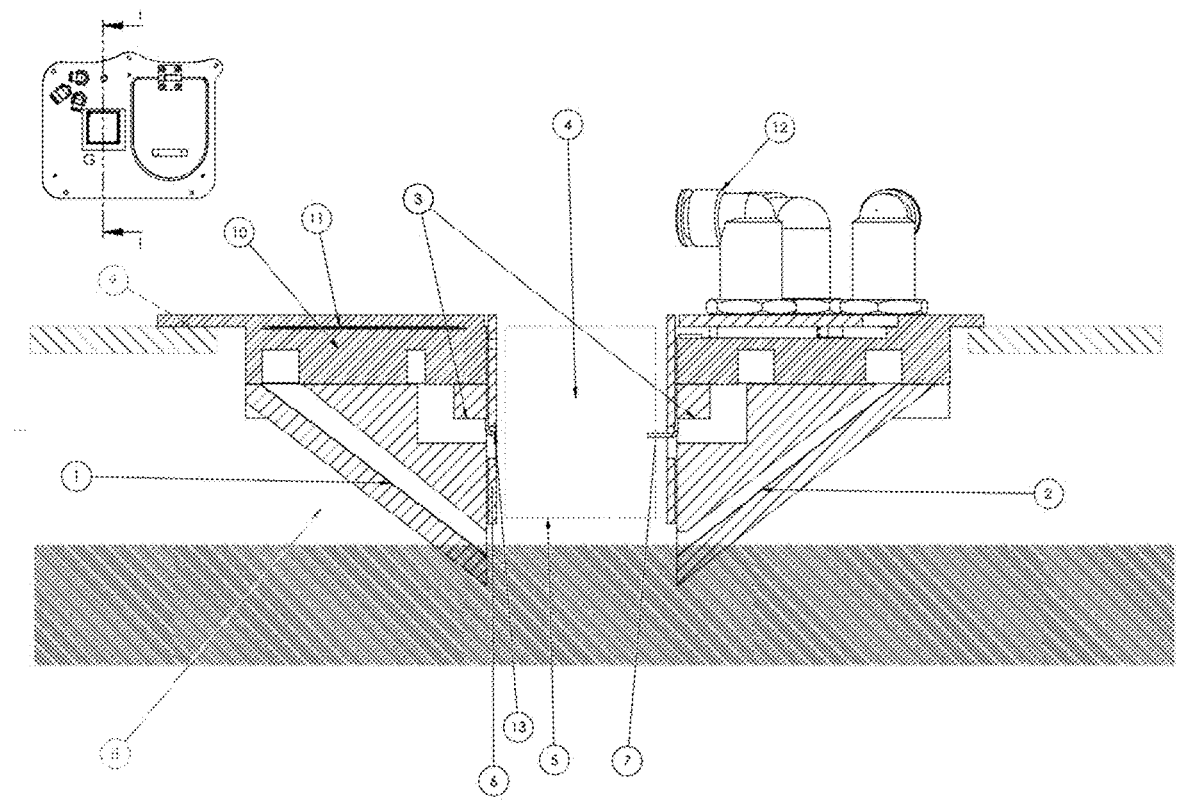
FIG. 9. Section view of a manifold according to another exemplary embodiment of the present invention. (1) is the vacuum channel, (2) is the dry make-up gas channel, (3) is the dry gas bore flood channel, (4) is the bore, (5) is a heater (indicated by a dashed line since it is not visible in this section) attached to front and back walls (in this view) of the metal sleeve (6) surrounding the bore and extending to the top surface of the lid, which is connected to a temperature controller, (7) is a temperature sensor projecting into the bore for monitoring the bore gas temperature, (8) is the space of trapped gas between the top surface of the manifold and the lid (9) (that seals to the manifold and to the perimeter of the liquid cryogen container) and the liquid cryogen, (10) is comprised of aluminum plates that distribute heat uniformly in the top surface of the manifold, (11) is a heater that heats the top surface of the manifold to prevent frosting and ice formation, (12) is a gas connector for one of the bore flood or make-up gas supplies, and (13) is a temperature sensor for the bore sleeve heater (5). Not shown is thermally insulating material that covers the lower surface of the lid in the regions that extend beyond the manifold.

The manifold prototypes were constructed from 4 lb high-density cross-linked polyurethane foam which combines high thermal insulating capabilities with sufficient structural strength to form gas channels with walls of 0.2 inch thickness. An alternative, earlier manifold is shown in FIG. 8 combines a metal component for a heated surface and a ceramic component for good insulation, and has better dimensional stability when cooled than manifolds constructed of foam or solid polymers.

The manifold is 1 inch thick where there are no gas channels beneath the manifold. This is determined by the thermal insulating properties and structural stiffness of the material used.

The gas channels in the manifold of an exemplary device are formed, in the top portion adjacent to the ambient environment, by layers of ⅛ inch aluminum sheet with cut-outs to form the channels, coupled to the bottom portion formed from a 4 lb density polyurethane tooling board material available under the trade name Ren-Shape 450. The channels in the tooling board are formed by a combination of machined blocks of board and epoxied machined sheets of the same material. Surface roughness of a material in liquid nitrogen affects $N_2$ bubble nucleation rates. Where the thermal insulating material/gas manifold enters the liquid nitrogen, its surface is cut cleanly to reduce nucleation.

Liquid nitrogen and other cryogens will 'wet' many surfaces, including the foam used in prototype manifold construction. The inside area of the plunge well on a prototype was smoothly coated with silicone (any material that the cryogen will not 'wet' would work, such as a skim-coat of epoxy) to reduce wetting. The RenShape 450 material used in current exemplary devices does not show wetting as significant as the foam, but as a best practice it is coated with silicone to reduce liquid cryogen boiling. Before coating the foam on a prototype will 'wet' about 0.15 inches up the bore, with significant negative effects: 1) the liquid nitrogen wetting the wall reaches the level of the bore heater, increasing the required size of the heater and increasing liquid nitrogen consumption; 2) the liquid nitrogen in contact with the bore wall greatly cools the unheated portions of the bore; and 3) the liquid nitrogen greatly contributes to the formation of cold gas. After surface treatment, the liquid nitrogen will only 'wet' about 0.05 inches of the bore wall. Ceramics and other possible bore materials will have different wetting properties, and may or may not require coating.

The bore heater insert is placed down the bore to the tops of the vacuum and make-up gas passages, which is to within 0.15 inches of the liquid nitrogen/cryogen surface.

The bore heater insert extends to the top of the manifold and is level with the top surface of the lid. In an exemplary device, the bore heater insert is a rectangular stainless-steel tube machined with ports for the bore-flood passages, and has two 40 W Kapton heaters attached to the outside of the insert, on its two faces that do not have the vacuum, make-up gas, and bore flood ports. A thermocouple bonded to the insert connects to the bore heater controller. Kapton heaters are used since the bore insert may be subjected to cryogenic temperatures.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As may be used herein and in the appended claims for purposes of the present disclosure, the term 'about' means the amount of the specified quantity plus/minus a fractional amount of or reasonable tolerance thereof that a person skilled in the art would recognize as typical and reasonable for that particular quantity or measurement. Likewise, the term 'substantially' means as close to or similar to the specified term being modified as a person skilled in the art would recognize as typical and reasonable as opposed to being intentionally different by design and implementation.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

We claim:

1. A cryogenic cooling system, comprising:
   a Dewar containing a cryogenic liquid;
   an integral manifold body having an outer periphery, a top portion, and a bottom portion, the integral manifold body disposed over the Dewar containing the cryogenic liquid, the integral manifold body defining a vertically oriented plunge bore having a central longitudinal axis and extending through the integral manifold body from the top portion to the bottom portion, the plunge bore defined by a plurality of walls that runs vertically so as to form a continuous passage through the integral manifold body, the integral manifold body defining a plurality of gas supply and exhaust channels that intersect the plunge bore, the plurality of gas supply and exhaust channels including a vacuum channel and a make-up gas channel, wherein the vacuum channel and the make-up gas channel are the channels of the plurality of gas supply and exhaust channels which intersect the plunge bore closest to the bottom portion of the integral manifold body;
   wherein the vacuum channel intersects the plunge bore at a location opposite the intersection of the make-up gas channel and the plunge bore; and wherein a portion of a bottom surface of the integral manifold body adjacent to the plunge bore is angled in a direction from the outer periphery toward the cryogenic liquid and toward the central longitudinal axis of the plunge bore.

2. The cryogenic cooling system of claim 1, wherein the plurality of gas supply and exhaust channels and the plunge bore have a cross section perpendicular to a gas flow direction that is rectangular.

3. The cryogenic cooling system of claim 1, wherein the vacuum channel and the make-up gas channel intersect the plunge bore at an angle relative to a horizontal plane perpendicular to the central longitudinal axis of the plunge bore.

4. The cryogenic cooling system of claim 3, wherein the angle of the make-up gas channel is between 25° to 50° relative to the horizontal plane.

5. The cryogenic cooling system of claim 1, wherein the make-up gas channel has a chamfer from 0.08 inches to 0.2 inches on at least a portion of one of a plurality of edges of the make-up gas channel.

6. The cryogenic cooling system of claim 3, wherein the angle of the vacuum channel is between 10° to 55° relative to the horizontal plane.

7. The cryogenic cooling system of claim 1, wherein at least one of the plurality of gas supply and exhaust channels is a bore flood gas channel, and wherein the bore flood gas channel intersects the plunge bore closer to the top portion of the integral manifold body than the bottom portion of the integral manifold body.

8. The cryogenic cooling system of claim 1, further comprising a heater disposed on the plurality of walls that define the plunge bore.

9. The cryogenic cooling system of claim 2, wherein the plunge bore has a width dimension, $W_{PB}$, perpendicular to the central longitudinal axis of the plunge bore and parallel to a plane perpendicular to the central longitudinal axis of the plunge bore, and wherein the plurality of gas supply and exhaust channels each has a width dimension, $W_{CH}$, wherein $W_{CH}=W_{PB}+/-10\%$ where the plurality of gas supply and exhaust channels intersect the plunge bore.

10. The cryogenic cooling system of claim 1, wherein flow of gas in the vacuum channel and the make-up gas channel is along a surface of the cryogenic liquid within the plunge bore and within a region of the vacuum and make-up gas channels extending back into the vacuum and make-up gas channels from the plunge bore.

11. The cryogenic cooling system of claim 1, wherein the vacuum channel and the make-up gas channel are sloped toward the bottom surface where the vacuum and make-up gas channels intersect the plunge bore.

12. A method for cryogenically cooling a sample, the method comprising:
providing a cryogenic cooling manifold including an integral manifold body having an outer periphery, a top portion, and a bottom portion, the integral manifold body configured to be disposed over a Dewar containing a cryogenic liquid medium, the integral manifold body defining a vertically oriented plunge bore having a central longitudinal axis and extending through the integral manifold body from the top portion to the bottom portion, the plunge bore defined by a plurality of walls that runs vertically so as to form a continuous passage through the integral manifold body of the cryogenic cooling manifold, the integral manifold body defining a plurality of gas supply and exhaust channels that intersect the plunge bore, the plurality of gas supply and exhaust channels including a vacuum channel and a make-up gas channel, wherein the vacuum channel and the make-up gas channel are the channels of the plurality of gas supply and exhaust channels which intersect the plunge bore closest to the bottom portion of the integral manifold body;
wherein the vacuum channel intersects the plunge bore at a location opposite the intersection of the make-up gas channel and the plunge bore;
wherein a portion of a bottom surface of the integral manifold body adjacent to the plunge bore is angled in a direction from the outer periphery toward the cryogenic liquid and toward the central longitudinal axis of the plunge bore; and
disposing the cryogenic cooling manifold over the liquid cryogenic medium such that a surface level of the liquid cryogenic medium is at least partially above a floor of the make-up gas channel and at least partially above a floor of the vacuum channel where each of the make-up gas channel and the vacuum channel intersects the plunge bore.

13. The method of claim 12, further comprising flooding the plunge bore with a dry gas immediately prior to a sample plunge command.

14. The method of claim 12, further comprising flooding the plunge bore with a dry gas.

15. The method of claim 13, further comprising, after the sample plunge command:
stopping the plunge bore flooding;
applying vacuum to the plunge bore;
providing a supply of make-up gas to the plunge bore; and
vertically translating the sample into the liquid cryogenic medium at a controlled rate.

16. The method of claim 15, further comprising:
stopping the supply of the make-up gas; and
flooding the plunge bore with a dry inert gas.

17. The method of claim 15, further comprising intermittently evacuating the plunge bore and supplying the make-up gas in a timed manner.

18. The method of claim 15, further comprising controlling a thickness of a cold gas layer in the plunge bore immediately prior to the sample plunge command for slow and/or variable rate cooling.

19. The method of claim 18, further comprising moving the sample through the plunge bore at a non-uniform plunge rate.

20. The cryogenic cooling system of claim 1, wherein the plurality of gas supply and exhaust channels include a dry gas supply channel that intersects the plunge bore and enables bore flooding with dry gas.

21. The cryogenic cooling system of claim 1, where a top end of the plunge bore opens to ambient air, and a bottom end of the plunge bore is immersed in or just above a surface of the cryogenic liquid.

22. The cryogenic cooling system of claim 1, where a top end of the plunge bore is covered by a shutter that seals the top end from ambient air and opens to allow samples to be translated from above the plunge bore, through the plunge bore, and into the cryogenic liquid.

23. The cryogenic cooling system of claim 1, where a gas supplied to the gas supply channels is dry nitrogen, dry helium, or dry air, and where dry means a moisture content of substantially less than 20 parts per million by volume.

24. The cryogenic cooling system of claim 1, wherein the cryogenic liquid forms a floor of the plunge bore and extends at least partially into the vacuum channel and the make-up gas channel.

25. A cryogenic cooling system, comprising:
a Dewar containing a cryogenic liquid;
a cryogenic cooling manifold including an integral manifold body having an outer periphery, a top portion and a bottom portion, the integral manifold body disposed over the Dewar containing the cryogenic liquid, the integral manifold body defining a vertically oriented plunge bore having a central longitudinal axis and extending through the integral manifold body from the top portion to the bottom portion, the plunge bore defined by a plurality of walls that runs vertically so as to form a continuous passage through the integral manifold body of the cryogenic cooling manifold, the integral manifold body defining a plurality of gas supply and exhaust channels that intersect the plunge bore, the plurality of gas supply and exhaust channels including a vacuum channel and a make-up gas channel, wherein the vacuum channel and the make-up gas channel are the channels of the plurality of gas supply and exhaust channels which intersect the plunge bore closest to the bottom portion of the integral manifold body;
wherein the vacuum channel intersects the plunge bore at a first intersection opposite a second intersection at a second location of the make-up gas channel and the plunge bore;
wherein a portion of a bottom surface of the integral manifold body adjacent to the plunge bore is angled in a direction from the outer periphery toward the cryogenic liquid and toward the central longitudinal axis of the plunge bore; and
wherein a width of the vacuum channel at the first intersection or a width of the make-up gas channel at the second intersection is within +/−10% a width of the plunge bore at the first intersection or the second intersection, respectively.

26. The cryogenic cooling system of claim 25, wherein the width of the vacuum channel at the first intersection and the width of the make-up gas channel at the second intersection are within +/−10% the width of the plunge bore at the first intersection and the second intersection, respectively.

27. The cryogenic cooling system of claim 26, wherein the width of the vacuum channel at the first intersection and the width of the make-up gas channel at the second intersection are equal to the width of the plunge bore at the first intersection and the second intersection, respectively.

28. The cryogenic cooling system of claim 25, wherein the width of the vacuum channel at the first intersection or the width of the make-up gas channel at the second intersection is equal to the width of the plunge bore at the first intersection or the second intersection respectively.

29. The cryogenic cooling system of claim 1, wherein at least one of the plurality of gas supply and exhaust channels is a dry gas channel.

30. The cryogenic cooling system of claim 25, wherein at least one of the plurality of gas supply and exhaust channels is a dry gas channel.

* * * * *